United States Patent
Sliva

(10) Patent No.: US 7,565,161 B2
(45) Date of Patent: Jul. 21, 2009

(54) METHOD AND SYSTEM FOR WIRELESS PRIORITY CALL PROCESSING

(75) Inventor: Vladimir Petr Sliva, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 469 days.

(21) Appl. No.: 11/317,698

(22) Filed: Dec. 23, 2005

(65) Prior Publication Data

US 2007/0149203 A1    Jun. 28, 2007

(51) Int. Cl.
H04B 7/00    (2006.01)
(52) U.S. Cl. ............... 455/512; 455/509; 455/514; 455/435.3; 455/452.2; 370/329
(58) Field of Classification Search ........... 455/512, 455/452.1–452.2, 450, 509, 453, 514, 435.3, 455/445; 370/328–329
See application file for complete search history.

(56) References Cited

U.S. PATENT DOCUMENTS

| | | | | |
|---|---|---|---|---|
| RE32,789 E | * | 11/1988 | Lynk et al. | 455/512 |
| 5,226,071 A | * | 7/1993 | Bolliger et al. | 455/435.3 |
| 5,301,356 A | * | 4/1994 | Bodin et al. | 455/436 |
| 5,457,735 A | * | 10/1995 | Erickson | 455/450 |
| 5,537,684 A | * | 7/1996 | Cassidy et al. | 455/512 |
| 5,551,062 A | * | 8/1996 | Drozt et al. | 455/512 |
| 5,574,977 A | * | 11/1996 | Joseph et al. | 455/450 |
| 5,615,249 A | * | 3/1997 | Solondz | 455/450 |
| 5,794,156 A | * | 8/1998 | Alanara | 455/517 |
| 5,862,485 A | * | 1/1999 | Linneweh et al. | 455/450 |
| 6,061,339 A | * | 5/2000 | Nieczyporowicz et al. | 370/335 |
| 6,067,457 A | * | 5/2000 | Erickson et al. | 455/512 |
| 6,069,882 A | * | 5/2000 | Zellner et al. | 370/329 |
| 6,321,093 B1 | * | 11/2001 | Dalal | 455/512 |
| 6,374,099 B1 | * | 4/2002 | Bi et al. | 455/404.1 |
| 6,597,920 B2 | * | 7/2003 | Yegani et al. | 455/512 |
| 6,985,740 B2 | * | 1/2006 | Shyy et al. | 455/453 |
| 7,024,203 B1 | * | 4/2006 | Naghian | 455/453 |
| 7,212,506 B2 | * | 5/2007 | Varney et al. | 370/329 |
| 7,218,619 B2 | * | 5/2007 | Koo et al. | 370/329 |
| 7,295,514 B2 | * | 11/2007 | Cha et al. | 370/230 |
| 7,313,407 B2 | * | 12/2007 | Shapira | 455/512 |
| 7,450,949 B2 | * | 11/2008 | Choksi | 455/452.2 |
| 7,477,916 B2 | * | 1/2009 | Sinnarajah et al. | 455/550.1 |
| 2002/0027890 A1 | | 3/2002 | Bernstein et al. | |
| 2003/0220115 A1 | | 11/2003 | Hitzeman | |
| 2005/0101324 A1 | | 5/2005 | Chambers et al. | |
| 2005/0159160 A1 | | 7/2005 | Chambers et al. | |
| 2005/0265282 A1 | * | 12/2005 | Gross et al. | 370/329 |
| 2005/0265335 A1 | | 12/2005 | Ramanath et al. | |

OTHER PUBLICATIONS

Call Processing Procedures, Section 6, "Wireless Priority Service (WPS) Industry Requirements for the Full Operating Capability (FOC) for CDMA-based Systems," Issue 1.0, Jun. 4, 2004; IDS filed on Dec. 23, 2005.*
Call Processing Procedures, Section 6, "Wireless Priority Service (WPS) Industry Requirements for the Full Operating Capability (FOC) for CDMA-based Systems," Issue 1.0, Jun. 4, 2004.

* cited by examiner

Primary Examiner—Sharad Rampuria

(57) ABSTRACT

A method and system for processing calls in a wireless network having a priority call system are provided. The system includes receiving means for receiving a message with an ordered resource list, first determining means for determining what resources are available for the mobile station, second determining means for determining whether to queue the call, sending means for sending a feature notification message to the mobile station, and creating means for creating a queue for each resource that is available for the mobile station.

11 Claims, 8 Drawing Sheets

METHOD AND SYSTEM FOR WIRELESS PRIORITY CALL PROCESSING

BACKGROUND OF THE INVENTION

This invention relates in general to wireless telecommunications and specifically to an improved method and system for processing prioritized wireless calls. While the invention is particularly directed to the art of wireless telecommunications, and will be thus described with specific reference thereto, it will be appreciated that the invention may have usefulness in other fields and applications.

By way of background, cellular telephones often provide the primary means of communication in emergency situations. Increased cellular phone usage by the general public, however, often results in network congestion, particularly during emergency situations. Such congestion could prevent key personnel from obtaining access to the network during an emergency, thereby delaying their responses to and resolution of the emergency.

One way to ensure access to wireless services during an emergency is to provide prioritized wireless services for key personnel. In prioritized wireless services, pre-identified users may be assigned a special priority level based on the importance of their role in resolving the emergency. Service requests from the users are queued and service is provided according to each user's priority.

An example of prioritized wireless services is the Wireless Priority Service (WPS) program developed by the Department of Homeland Security. The WPS is a White House-directed National Security/Emergency Preparedness (NS/EP) National Communications System (NCS) program dedicated to providing prioritized cellular network access for key national security and emergency response personnel. The goal of WPS is to provide an end-to-end nationwide wireless priority communications capability to key NS/EP personnel, using public network and the personnel's personal communication (mobile) device(s), during natural or man-made disasters or emergencies that cause congestion or network outages in the telecommunications network, including the Public Switched Telephone Network (PSTN).

Essentially, WPS is an enhancement to basic cellular service that allows prioritized NS/EP calls to queue for the next available service channel. The U.S. government specification for the WPS final capability defines 5 levels of priorities (priority 1-5, with priority 1 the highest priority) based on the WPS user's importance to national security. For example, to request WPS services for some mobile originations, a special user (whom the government designates and for whom the government pays a monthly fee for this service) needs to dial *272 and then the destination number. The user's call is then sent to its nearby base station (BS) and mobile switching center (MSC) and is queued for an available radio channel according to the user's priority. There are other ways to dial a NS/EP call and this includes also mobile terminations. A complete description of WPS can be found in "Wireless Priority Service (WPS) Industry Requirements for the Full Operating Capability (FOC) for CDMA-based Systems," Issue 1.0, Jun. 4, 2004.

The WPS Industry Requirements (IR) define only one queue per sector of a cell, as noted in the last two paragraphs on page 6-8 before R-85 and in R-85 itself. Such queue is created when a special priority (National Security/Emergency Preparedness (NS/EP)) originating or terminating call has to wait for cell resources. When such a queue exists, the Hard Public Use Reservation by Departure Allocation (H-PURDA) algorithm is applied to the call attempts that follow. If a new call could use a different bandclass (B) than the one (A) due to which the queue was created, the "H-PURDA" algorithm recommended by the IR blocks even such new calls that arrive on bandclass B, not just the calls that would arrive on the blocked (exhausted) A.

The present invention contemplates a new and improved way that resolves the above-referenced difficulties and others. For example, it would be helpful for all of the truly available radio traffic channels to be used by the mobiles that are so equipped, rather than having all the new calls blocked while waiting for the one scarce resource of a certain type. to free up. Specifically, there should be as many potential queues defined per sector as there are applicable resource types such as different CDMA bandclasses.

SUMMARY OF THE INVENTION

A method and system for providing multiple wireless priority service queues per cell and sector are provided.

In one aspect of the invention, a method of processing a call request received in a wireless network having an active call allocation system in place is provided. The method comprises determining whether radio traffic channel resources are available for the call request without involving a queue, allowing the call request to go through where radio traffic channel resources are available without involving a queue. And where the call request is for a priority call, the method further includes initially creating a queue for each radio traffic channel resource type per cell sector available in the network and for each queue thus created, determining whether the queue is full and adding the priority call to the queue where the queue is not full, determining whether the queue has an existing call request of lower priority where the queue is full, and not entering the request in this queue and aborting the priority call request if the network is not able to enter the request to any queue, where the full queue does not have an existing call request of lower priority. Finally, where the full queue does have an existing call request of lower priority, the existing call request of lower priority is displaced, the displaced call is aborted if it is not in another queue, and the new call request is added to the queue.

In another aspect of the present invention, a method of processing a call departure in a wireless network having an active call allocation system in place is provided. The method comprises determining whether to allocate a call request from a queue for a radio traffic channel per cell sector or to a public call. If the queue is empty, it is acknowledged that radio traffic resources are available and the queue is released. However, if the queue is not empty, then the call request from the queue is served and the call assignment is counted (as NS/EP for alternating with public purposes) and the call request is released from any other queues in which the call request is located.

In yet another aspect of the present invention, a method of processing or terminating a call from or to a mobile station in a wireless network having a priority call system is provided. The method comprises determining what resources are available for the mobile station, receiving a (feature notification) message at the mobile with an ordered resource list, and determining whether to queue the call and in which queues, also based on the mobile user's preference.

In yet another aspect of the present invention, a system for processing calls in a wireless network having a priority call system is provided. The system comprises receiving means for receiving a message with an ordered resource list, first determining means for determining what radio traffic channel resources per cell sector are available for the mobile station, second determining means for determining whether to queue the call, sending means for sending a feature notification message to the mobile station, and creating means for creating a queue for each radio traffic channel resource type per cell sector that is available for the mobile station.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
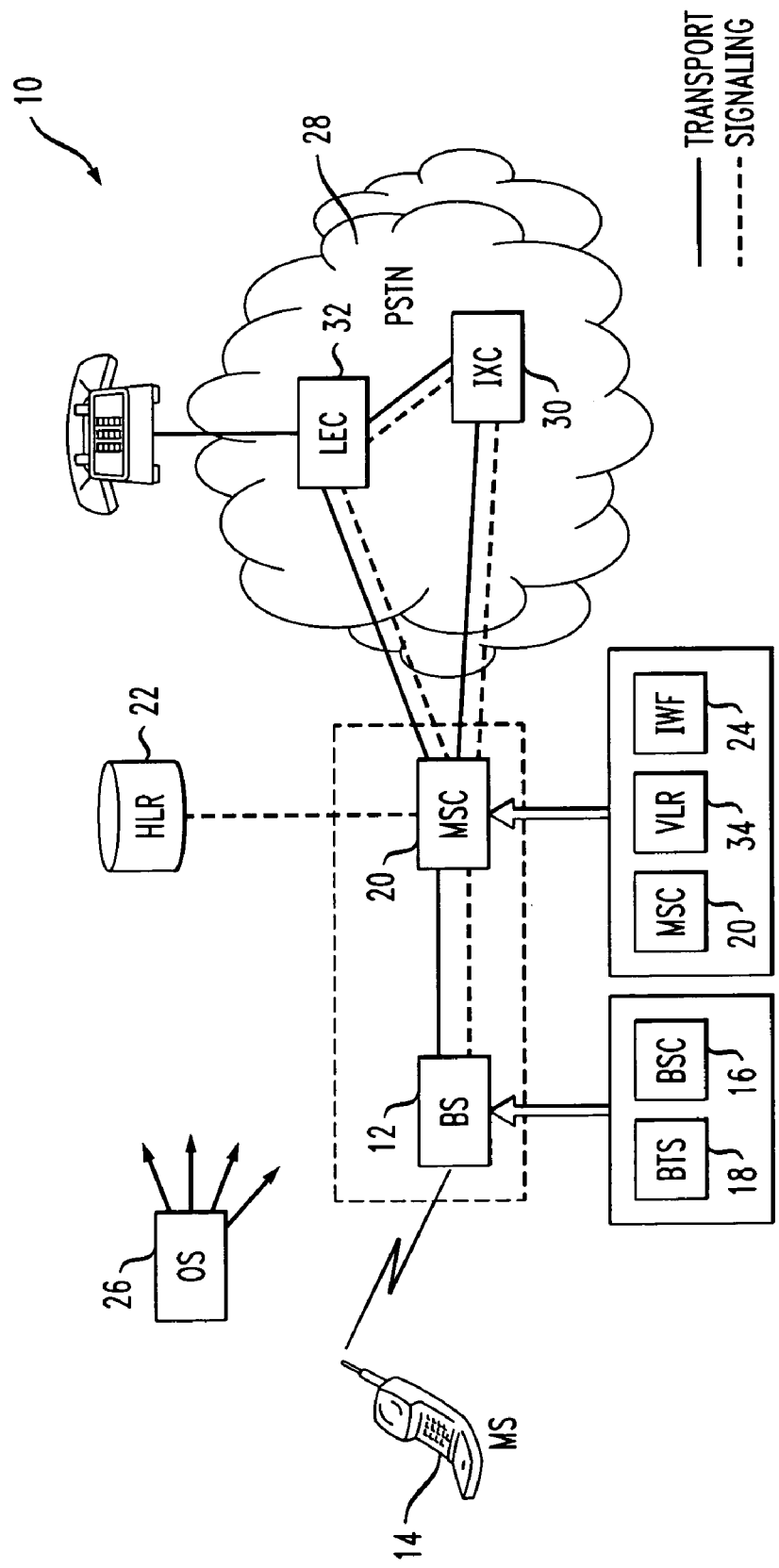
FIG. 1 is a block diagram of a telecommunications network suitable for implementing aspects of the present invention.

Referring now to the drawings wherein the showings are for purposes of illustrating the preferred embodiments of the invention only and not for purposes of limiting same, FIG. 1 provides a view of a part of the overall preferred system according to the present invention. As shown, the high-level architecture for WPS is based on the current architecture for wireless carrier networks.

FIG. 1 illustrates a telecommunications network 10, including the architectural components that are relevant for WPS requirements. The following material provides basic descriptions of the components in the network 10.

The Base Station (BS) 12 is an entity that provides the means for a number of Mobile Stations (MS) 14 to access network services using radio. The BS 12 includes a Base Station Controller (BSC) 16 and a Base Transceiver System (BTS) 18.

The BSC 16 is an entity that provides control and management for one or more BTSs 18. The BSC 16 exchanges messages with both the BTS 18 and the Mobile Switching Center (MSC) 20. Traffic and signaling concerned with call control, mobility management, and MS management may pass transparently through the BSC 16.

The Base Transceiver System (BTS) 18 is an entity that provides transmission capabilities across the radio interface. The BTS 18 consists of radio devices, an antenna and equipment.

The Home Location Register (HLR) 22 is the location register to which a user identity is assigned for record purposes such as subscriber information (e.g., Electronic Serial Number (ESN), Mobile Directory Number (MDN), Profile Information, Current Location, and/or Authorization Period).

The Inter-Working Function (IWF) 24 provides a translation of the user traffic on a data call between the fixed network and the air interface.

The Mobile Station (MS) 14 is a wireless terminal used by a subscriber to access network services over a radio interface. The MS 14 is the interface equipment used to terminate the radio path at the subscriber. The MS 14 may be a portable unit (e.g., a hand-held unit), a unit installed in a vehicle, or a fixed location unit.

The MSC 20 switches circuit mode MS-originated or MS-terminated traffic. The MSC 20 is usually connected to at least one BS 12. It may connect to the other public networks (PSTN, ISDN, etc.), other MSCs in the same network, or MSCs in different networks. The MSC 20 may store information to support these capabilities.

Operations System(s) (OS) 26 are responsible for overall management of the wireless network. Their functions may include the following:

Performance management—evaluation and reporting of network behavior and effectiveness.

Fault management—detection, isolation, and correction of abnormal operation.

Configuration management—control, identification, and data administration of network entities.

Accounting management—measurement of network usage and collection of accounting records.

Security management—protection from unauthorized access.

The PSTN 28 is well known in the art and defined in accordance with the appropriate ANSI T1 Standards.

The MSC 20 may connect to the PSTN 28 via direct Inter-exchange Carrier (IXC) facilities 30 or via a Local Exchange Carrier (LEC) network 32, as depicted in FIG. 1. The MSC 20 may alternately route such calls (to an LEC network 32 or an IXC network 30) via a wireless transit node. In addition, the MSCs 20 may connect directly with other MSCs 20.

The Visitor Location Register (VLR) 34 is the location register other than the HLR used by an MSC 20 to retrieve information for handling of calls to or from a visiting subscriber. The VLR 34 may or may not be located within, and be indistinguishable from, an MSC 20. The VLR 34 may serve more than one MSC 20.

In addition, a Service Provider may use transit nodes within its network. A Service Provider transit node is a switch within the Service Provider's network that is not the originating or terminating MSC. A wireless transit node may be a Home MSC1 or a tandem MSC. One or more transit nodes may be used when an originating MSC does not have a direct path to a terminating MSC to complete a call.

Figure 2:
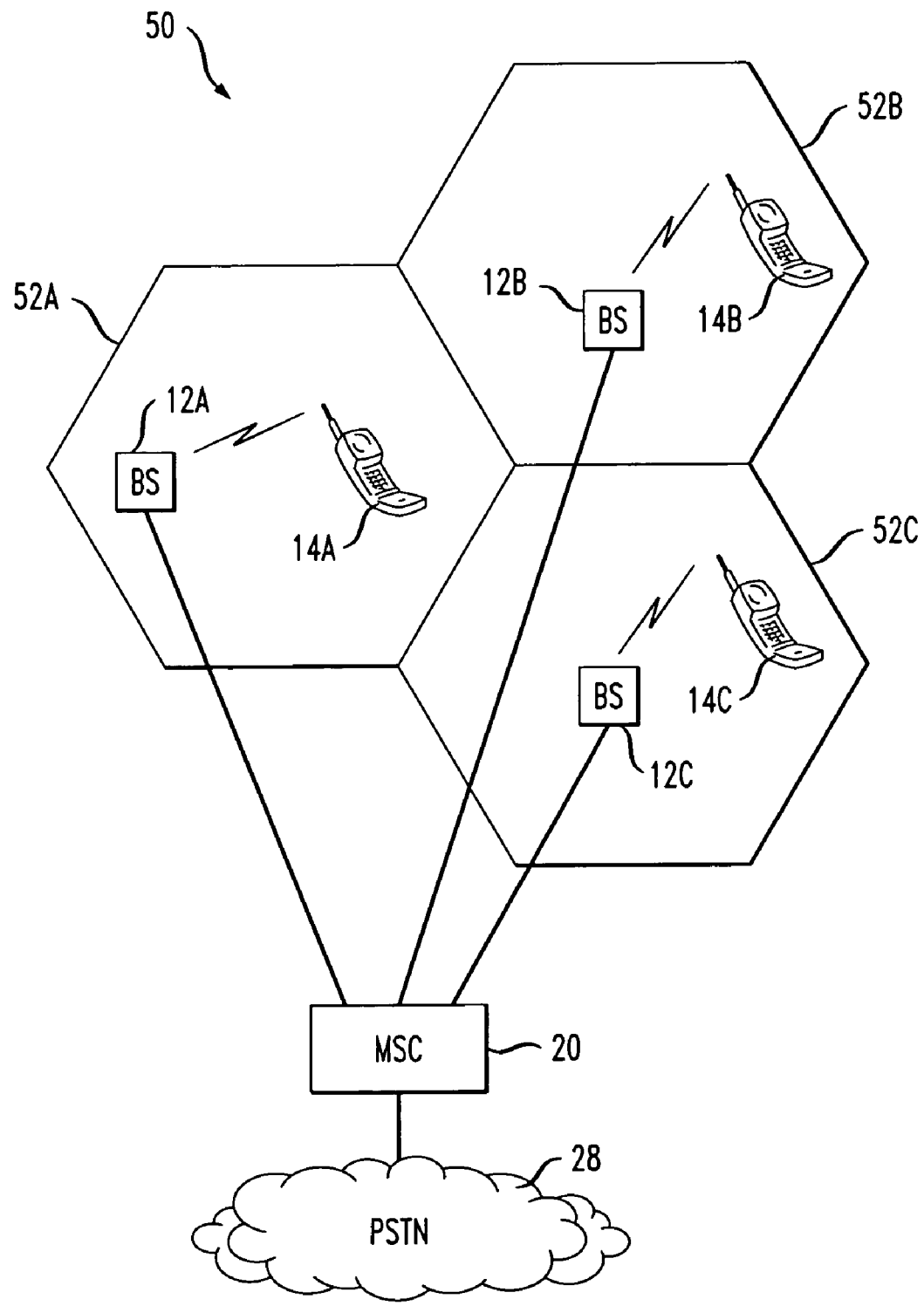
FIG. 2 is a block diagram of a cellular radio network.

FIG. 2 illustrates an exemplary wireless network 50, in which wireless traffic may be prioritized and placed in queues in accordance with principles of the present invention. The exemplary wireless network 50 comprises a plurality of cell sites 52, each containing a base station 12. In the exemplary embodiment, the base stations 12 communicate with a plurality of mobile stations 14 over code division multiple access (CDMA) channels according to, for example, the IS-2000 standard (i.e., CDMA2000). The mobile stations 14 may be any suitable wireless devices (e.g., conventional cell phones, PCS handsets, personal digital assistant (PDA) handsets, portable computers, telemetry devices) that are capable of communicating with the base stations 12 via wireless links.

The present invention is not limited to mobile devices. The present invention also encompasses other types of wireless access terminals, including fixed wireless terminals. For the sake of simplicity, however, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Figure 3:
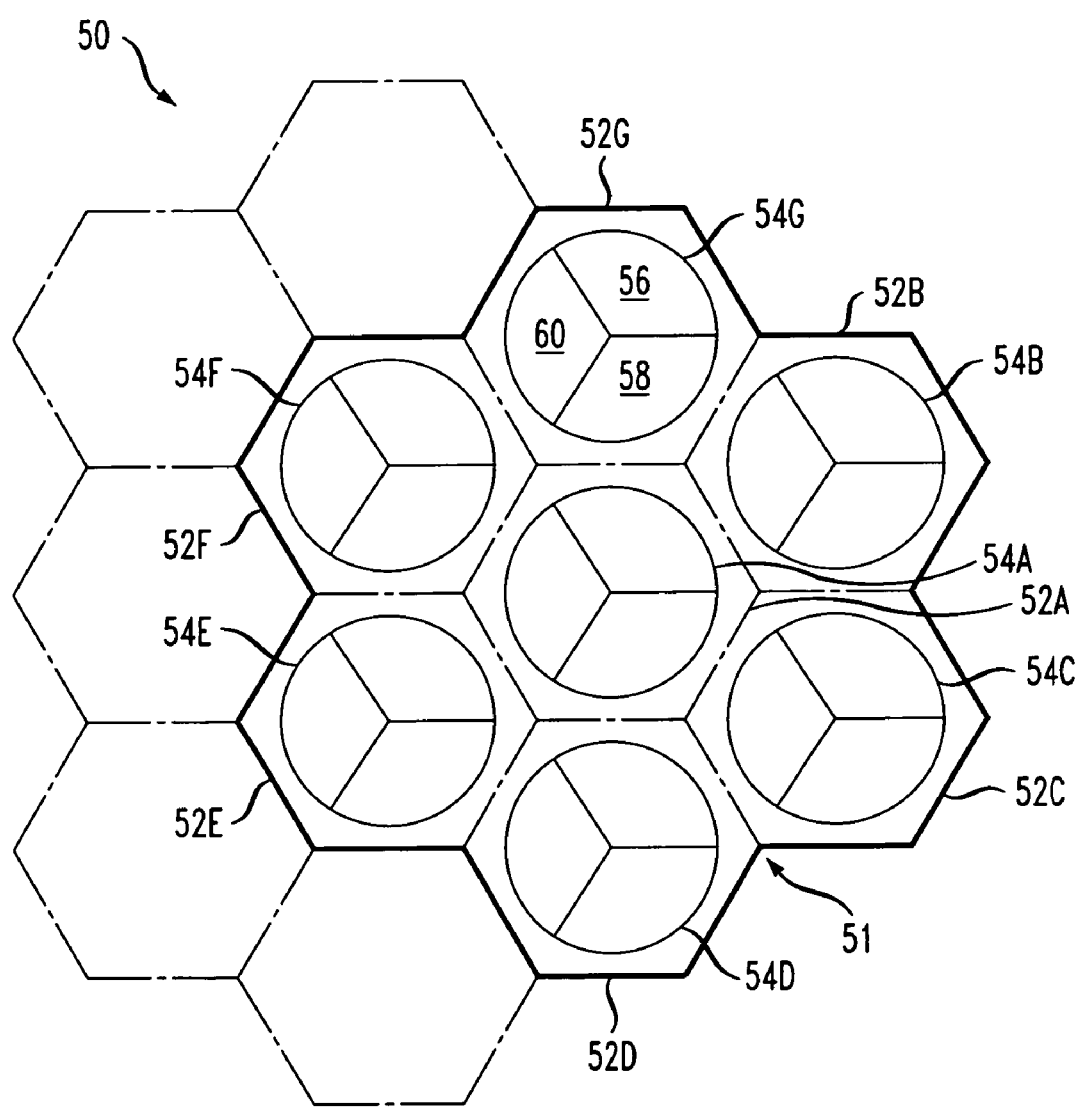
FIG. 3 is a schematic of a cell cluster for a cellular radio network having a three-sector antenna configuration.

FIG. 3 illustrates an example of a cell cluster 51 within the wireless radio network 50 having a three-sector antenna configuration and a frequency reuse factor of seven. The frequency reuse factor refers to the number of cells in a cluster. The service area of the cell cluster 51 is partitioned into seven cells 52A-G. Each of the cells is served by a corresponding base station 54A-G.

The coverage area for each of the base stations 54A-G is shown as approximately circular for the purposes of illustration and explanation only. It should be clearly understood that the coverage areas may have other irregular shapes, depending on the cell configuration selected and natural and man-made obstructions.

As is well known in the art, each of the cell sites 54A-G is comprised of a plurality of sectors 56, 58 and 60, where a directional antenna coupled to the base station "illuminates" each sector. See, for example, Flexent Modular Cell 4.0/4.0B—Outdoor Site Preparation Guidelines, 401-703-413, Issue 8, Dec. 2005. See also Series IIe Six Sector Support, 401-612-031, Issue 1, September 1994, which explains that each cell is divided into three or six sectors and uses three or six directional antenna faces.

The base station is typically located in the center of the cell 54. Alternate embodiments may position the directional antennas in corners of the sectors. Also, more than one antenna can serve a cell sector, especially when different bandclasses or technologies are involved. Sector is defined as the coverage area within the degree of directionality of the antennas (see also the above mentioned Flexent Modular Cell 4.0 document). The system of the present invention is not limited to any particular cell site configuration.

Wireless networks may support more than one bandclass within a sector. For example, Lucent Technologies' 1BTS modcell 4.0 supports two bandclasses.

EXAMPLE 1

Now, for purposes of discussion, let us assume that a cell is a dual band cell and supports at least two Code Division Multiple Access (CDMA) bandclasses, in this case, cellular services at 800 MHz and Personal Communication Services (PCS) at 1.9 GHz. Let us further assume that all of the 800 MHz bandclass radio resources (channels) are fully utilized. Mobile Station 14A working with 800 MHz only makes a National Security and Emergency Preparedness (NS/EP) call, and, since there are no 800 MHz bandclass radio resources available, it creates a queue for the respective cell sector. Mobile Station 14B, which supports both 800 MHz and 1.9 GHz bandclasses, then attempts NS/EP origination with the same priority as Mobile Station 14A in the same sector as Mobile Station 14A. Following the Industry Requirements, Mobile Station 14B has to wait in a queue for the radio channel. In contrast to that, according to the method described below, the dual mobile station that supports the available channel be served immediately (new) on the available 1.9 GHz bandclass.

The list of various bandclasses supported by mobile phones has been growing. For example, here is what would the subscriber form for the Mobile Station 14B from Example 1 contain (in Lucent ECP Release 27):

TABLE 1

SUBSCRIBER AND FEATURE INFORMATION
Band Classes Supported by Mobile:

| |
|---|
| BC0 850 . . . 230) y |
| BC1 1900 . . . 231) y |
| BC2 TACS . . . 232) n |
| BC3 JTACS . . . 233) n |
| BC4 Korean PCS . . . 234) n |
| BC5 450 . . . 235) n |
| BC6 IMT-2000 . . . 236) n |
| BC7 700 . . . 237) n |
| BC8 1800 . . . 238) n |
| BC9 900 . . . 239) n |
| BC10 SEC-800 . . . 240) n |
| BC13 E-PCS . . . 241) n |

Figure 4:
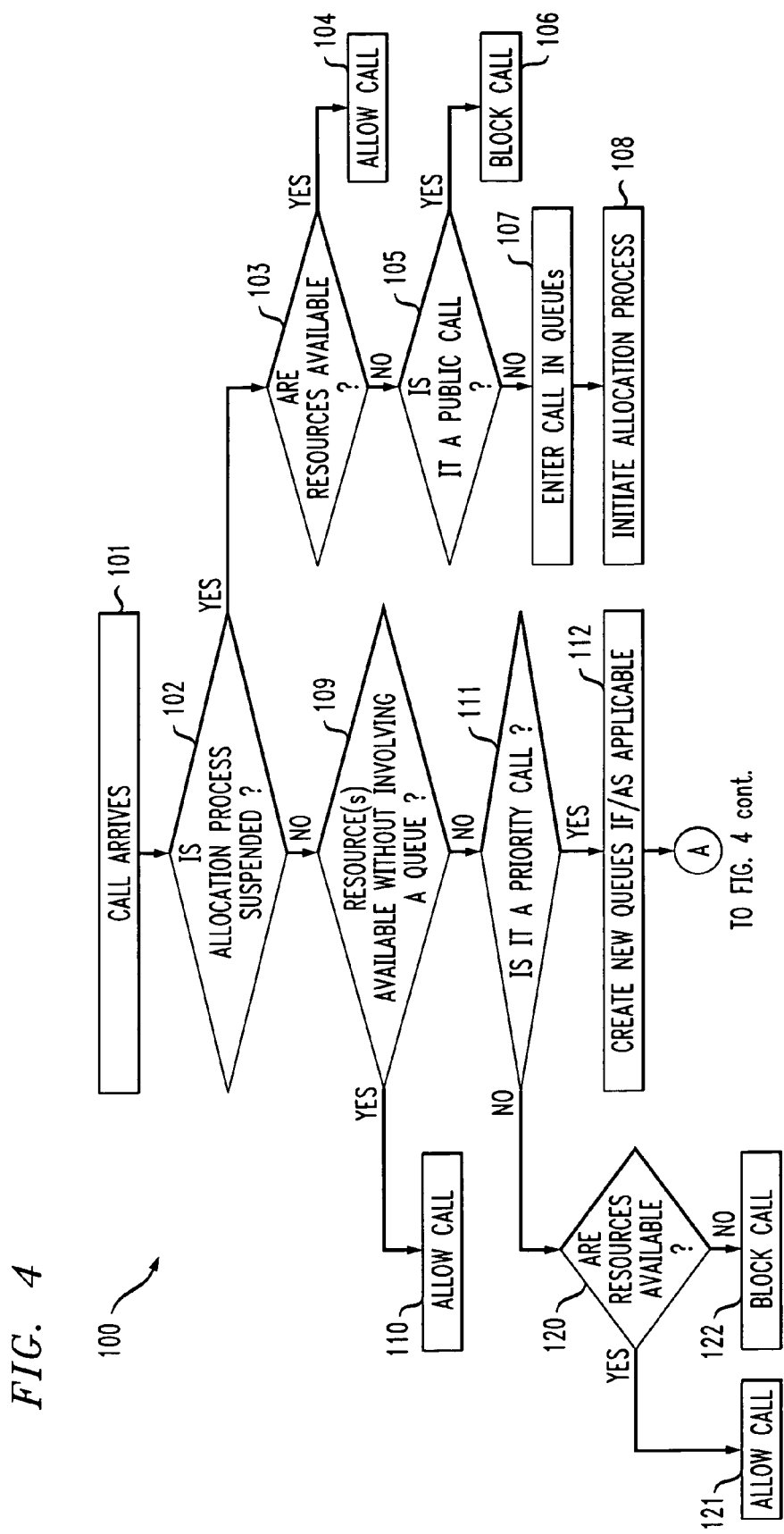
FIG. 4 is a flow chart of a method performed by the wireless system (e.g., a base station) in one embodiment of the present invention.
Figure 4:
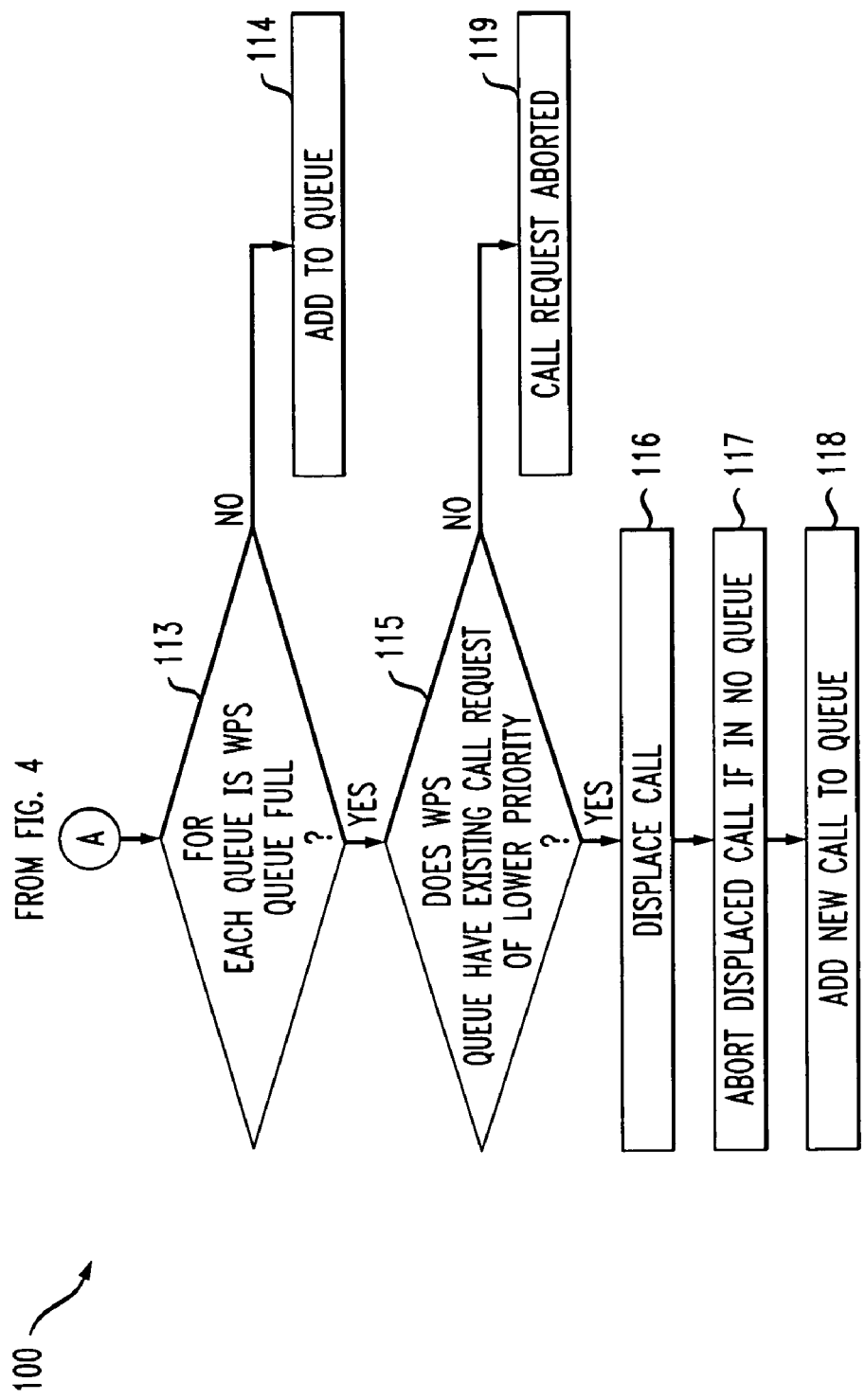

FIG. 4 sets forth a method 100 for handling call arrivals that will allow use of the free resources and optimize resource utilization, while allowing more calls, especially NS/EP—but also public—calls, to get through. The method 100 is defined on a cell sector basis. The steps described below are performed by the applicable "network" as viewed by the mobile device, where the "network" would most likely be the BS 12 or perhaps the MSC/BS complex.

Let us assume that a new call request (originating or terminating) arrives (101). A determination is made as to whether the allocation process is suspended (102). If that is the case, then a determination is made as to whether there are radio traffic channel resources available (103). If so, then the radio traffic channel is assigned to the new call request (104). Otherwise, (i.e., radio traffic channel resources are not available) determine whether the call request is for a public call (105). If so, then the call is blocked (106). However, if the call request is for an NS/EP call then (a) the call request is entered in the WPS queues for all bandclasses and/or technology types applicable to the call (107) and (b) the allocation process is initiated (108).

Returning now to step 102 for a moment, if the allocation process is active, then a determination is made as to whether one of the bandclasses or technology types applicable to the call does not have a queue associated with it and whether those resources are available (109). If so, then the call is allowed to be processed for that bandclass and/or technology type (110).

Otherwise (i.e., no bandclass or technology type applicable to the call without involving a queue is available), a determination is made as to whether the new call request is an NS/EP call request entitled to priority treatment (111). If the call is entitled to priority treatment, then, first, new queue(s) need to be created for those resource type(s) (i.e., bandclass or technology) for which there is no queue (112); and then, secondly, for each queue applicable for the call, the steps starting with step 113 are performed. Specifically, a determination is made as to whether the applicable WPS queue is full (113). If the applicable WPS queue is not full, then add the new call request to the WPS queue with position determined by priority and time (i.e., First In, First Out (FIFO) for each Priority) (114).

Otherwise (i.e., the WPS queue is full), a determination is made as to whether the WPS queue has an existing call request of lower priority than that of the new NS/EP call request (115). If so, then (a) the new call request displaces the call request of least priority, latest arrival in the WPS queue (116), (b) the displaced call request is aborted (for a queued originating WPS call request) or released (for a queued terminating NS/EP call request) if it does not stay in another queue at this point (117), and (c) the new call request joins the WPS queue with position determined by priority and time (i.e., FIFO for each priority) (118).

Optionally, in one possible variation of the method 100, if the call can be added to one or more non-full queues, it would not be let affect the calls in the already full queues. This could improve the overall system call throughput while only slightly limiting the calls of the highest priority by not including them in the already full queues, but these highest priority calls would still "bump" lower priority calls in the (originally) non-full queues.

Returning to step 115—if there is no call request of lower priority in the WPS queue, the new call request is aborted (for an originating WPS call request) or released (for a terminating NS/EP call request) if this is the last of the queues in the list and this new call has not been added to any other queue (119). If this is not the last queue to be considered, then this queue is skipped and the next one is considered.

Returning to step 111, if the new call request is a public call request, a determination is made as to whether radio traffic channel resources are available and allocated with preference (see N-1 notion below) to a public call request for any of the queues applicable to the bandclasses or technology of the call (120). If so, then the radio traffic channel is assigned to the public call request to one of these resources the assignment is counted (see N-1 notion below) toward the public's allocation for only this resource (121). Otherwise, the new call request is blocked (122).

Figure 5:
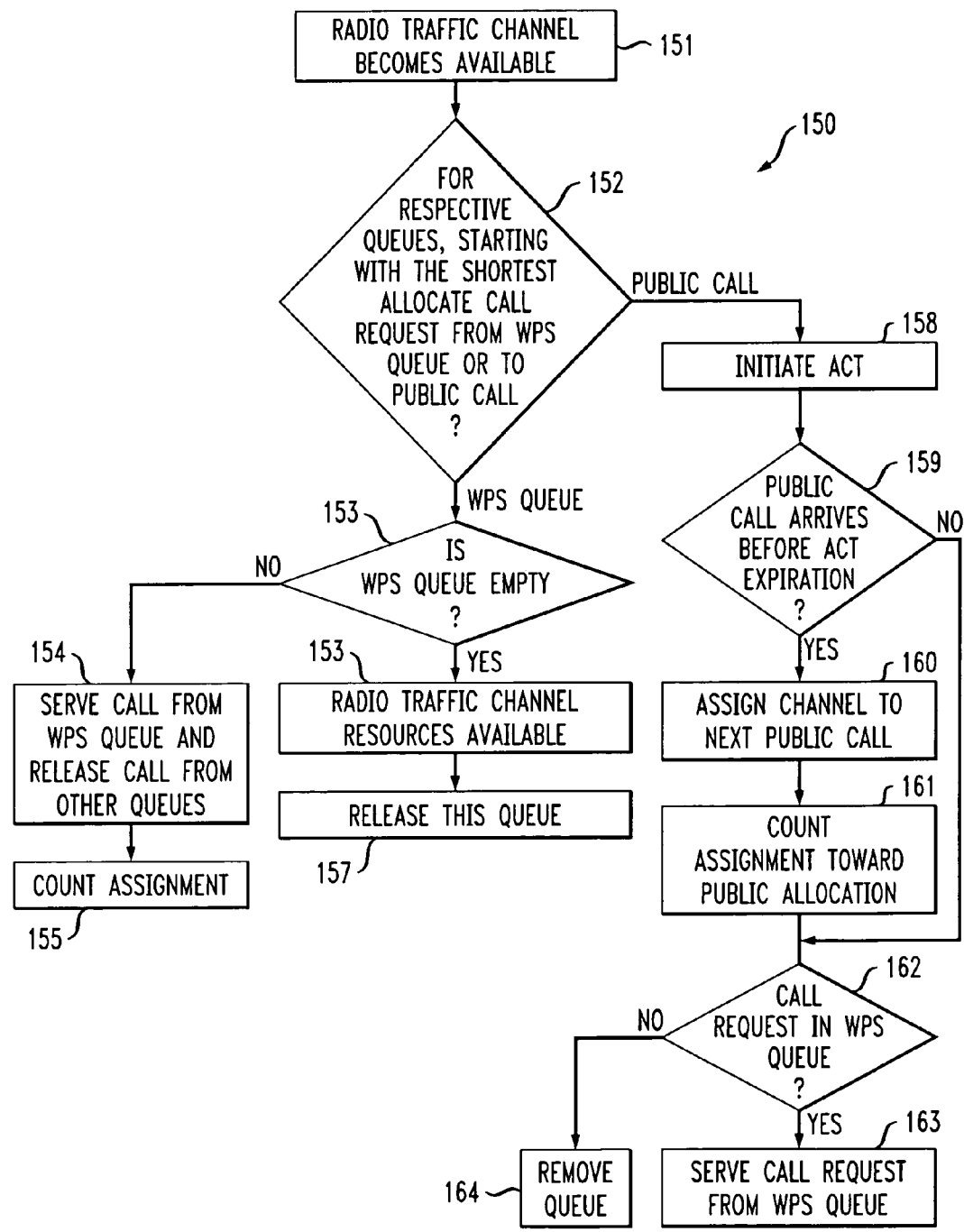
FIG. 5 is a flow chart of a method performed by the wireless system (e.g., a base station) in another embodiment of the present invention.

FIG. 5 sets forth a method 150 for handling call departures (while the allocation process is active). Initially, a radio traffic channel becomes available to be assigned to a new call request (e.g., when an established call is released) (151). Then, a determination is made as to whether the released radio traffic channel should be allocated to a call request from the WPS queue or to an arriving public call request (152). For a WPS ratio of 1/N, one out of N times the radio traffic channel should be allocated to a call request in the WPS queue. For a WPS ratio of 1/N, N-1 out of N times the radio traffic channel should be allocated to arriving public call requests. Note that one call departure can result in resources to be released from more than one queue, when the call that utilizes the released channel is removed from several queues. (Also, the plural "queues" in block 152 of FIG. 5 refers to a very general case where one "call" could be using several resource types and drop them all at once, releasing resources in more than one queue. For clarification as to why to start from the shortest such queues, consider an example where there may have been two queues—a released call frees up one slot in each such queue; if in both it would be the WPS call's turn, then, by assigning the resources from a shorter queue, another queue slot could be released from the longer queue).

If a radio traffic channel is to be allocated to a call request in the WPS queue, then a determination is made as to whether the WPS queue pertaining to that resource is empty (153). If it is not empty, then the call request from the WPS queue is served and this call is also released from any other queues in which it may have been placed (154). The assignment is counted toward the WPS allocation in this queue only (155).

However, if the WPS queue is empty, then (a) radio traffic channel resources are available for the next arriving (public or NS/EP) call request or other services needing the radio traffic channel resources (156) and this queue is released (157). The allocation process is suspended if there are no queues left (for this cell sector).

Returning now to step 152, if the radio traffic channel is to be allocated with preference to public calls, then (a) the radio traffic channel's Available Channel Timer (ACT) is initiated (158). Next, a determination is made as to whether the public call arrived before the ACT termination (159). If so, then the radio traffic channel is assigned to the next arriving public call request (160), and the assignment is counted toward the public allocation (161).

Given the N-1 formula, after serving a public call, a call from the WPS queue can be served (162). Also, if the ACT expires before the radio traffic channel is assigned and there is a call in the WPS queue, the radio traffic channel is used to serve a call request from the WPS queue and it is removed from all other queues (for this sector) in which it may be located (163). The radio traffic channel assignment is not counted toward the public or WPS allocation.

If the ACT expires before the radio traffic channel is assigned to a public call request and there is no call request in the WPS queue, then this queue is removed, and, if this was the last one, the allocation process is suspended and the radio traffic channel is used to serve the next arriving call request independent of the call type (164).

There are variations of the methods above, one already mentioned around step (113) where non-full queues would be preferentially filled up. Another potentially desired variation could ask for counting the calls (in step 120 and/or step 155) not just for the resource actually used but for all resources that could have been potentially used.

The trend is for mobile phones to support more and more bandclasses. The mobile phones currently sold often support two CDMA bandclasses (and some often also the analog mode), and this may be expanded in the future. In addition, the same mobile phone that supports 850 (BC0) and 1900 (BC1) CDMA bandclasses may support 1xEV-DO Rev-0 technology as well. Plus, the concept of supporting all technologies in a given sector can be extended into other mobile technologies as well, like GSM, UMTS, 1xEV-DO Rev-A or any future technology. The need to support NS/EP calls across technologies stems not only from mobile phones using several bandclasses of the same technology, but also from the fact that it takes time for the new technology to replace an older one and both tend to coexist for quite some time.

EXAMPLE 2

Figure 6:
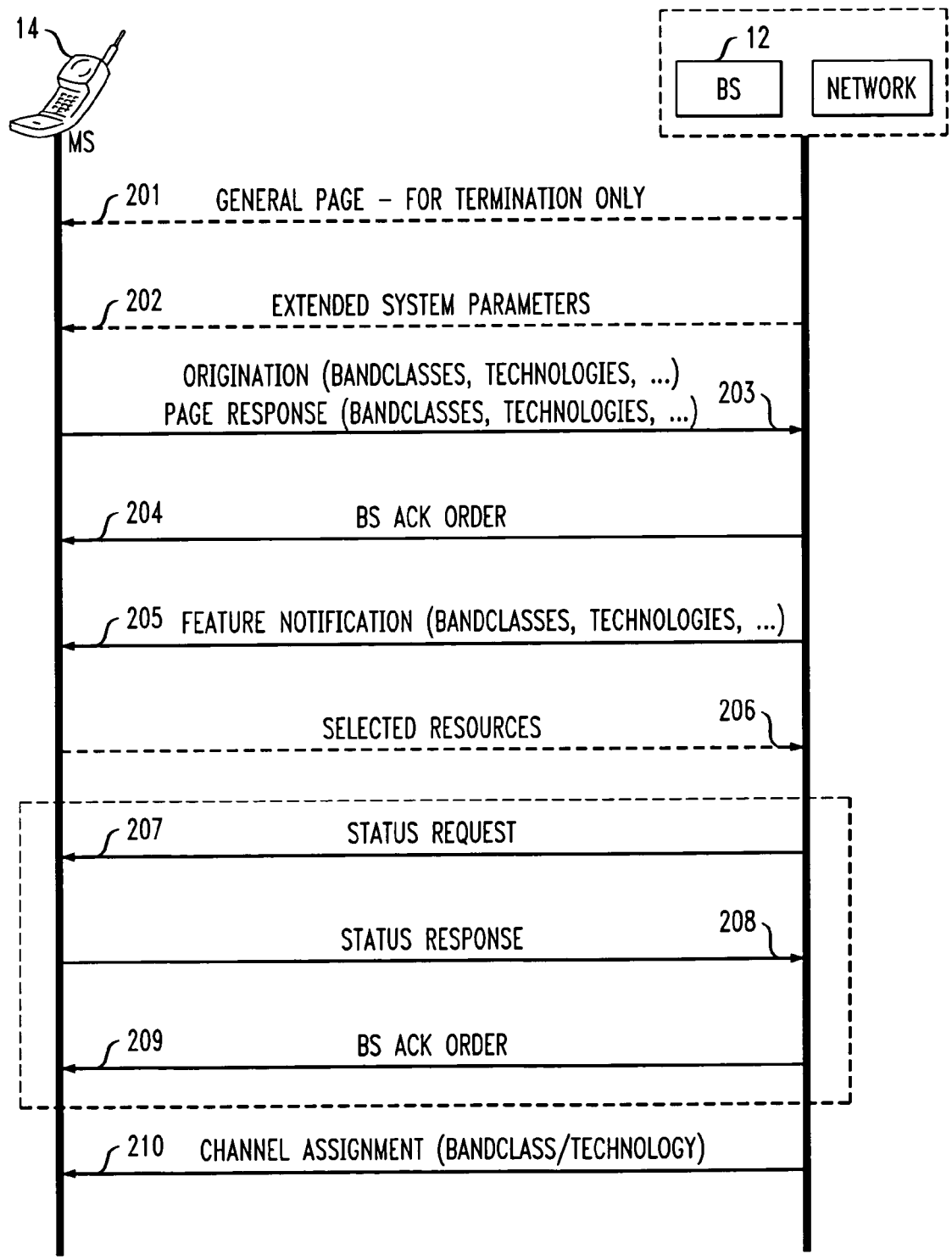
FIG. 6 schematically depicts the communications between a base station and a mobile station in yet another embodiment of the present invention.

The mobile station 14 supports 850 (BC0) and 1900 (BC1) CDMA bandclasses. FIG. 6 illustrates the communications between the base station 12 and the mobile station 14 in an embodiment of the present invention. In the case of call termination, a general page is sent to the mobile station 14 (201). Optionally, an Extended System Parameters message that is received on the Paging Channel, could convey all of the bandclasses and technologies available on that sector (202).

The mobile station 14 originates an NS/EP call by sending the Origination message (203). This could be, for example, by pressing 2 on the keypad and holding it for a moment to signify speed dial 2. The mobile station 14 could have this speed dial defined as having *272 pre-pended, meaning this is to be interpreted as an NS/EP call by the combination of the Base Station 12 and the network beyond that (which contains the MSC). The origination message contains the list of resource alternatives for this call such as bandclasses, technologies, service options and the like.

The BS 12 acknowledges the receipt of the Origination message by sending a "BS Ack Order" message (204) and both the mobile station 14 and the BS 12 start their timers to make sure they would not "hang," in the event no further messages are exchanged (on time). For purposes of this example, let us assume that no radio traffic channel resources are available and the mobile station 14 is entered to both queues and waits for a resource to become available.

A Feature Notification message is sent (205). This message includes information listing all the resources the queuing is for. Prior to this, optionally (for some or all systems), the signal strengths of each resource type between the mobile and the antenna(s) would be evaluated (not shown in FIG. 6) and only the reasonable resource set (that could truly support communication) would be sent in the Feature Notification.

After receiving this message, the mobile user or the mobile station 14 itself based on its programming should have an option to point out which of these resources they are willing to wait for (especially if this could mean a difference between a pure data or voice origination) and this information would be contained in a new message called Selected Resources, which would go from the mobile station 14 to the BS 12 (206). For origination, it is only at this point where the BS/Network know that this is an NS/EP call based on the analysis of the pre-pended digits *272.

Status request (207), status response (208) and BS Acknowledgement order (209) are exchanged and their purpose is to keep the mobile station 14 from timing out while the cell/network are waiting for the resources and have the call in a queue.

Finally, when a resource becomes available, for example, in the 1900 bandclass, the call is removed from the 1900 queue (210). Also, the call is removed from the 850 queue, however, here, the assignment toward the WPS allocation is not counted as that is only done for the 1900 queue.

In the existing standard (CDMA2000), only an "alternate" bandclass is covered. BS may broadcast in, for example, Extended System Parameters, that the "band class information is requested," but that mechanism only allows for one additional "alternate" bandclass. In this case, the specification of this alternative bandclass would also be contained in Extended System Parameters. CDMA2000 states that mobiles of version (P_REV) 8 or newer would set alternate band class support indicator (ALT_BAND_CLASS_SUP) depending on whether they support the "alternate" bandclass if Extended System Parameters message directs them so.

Figure 7:
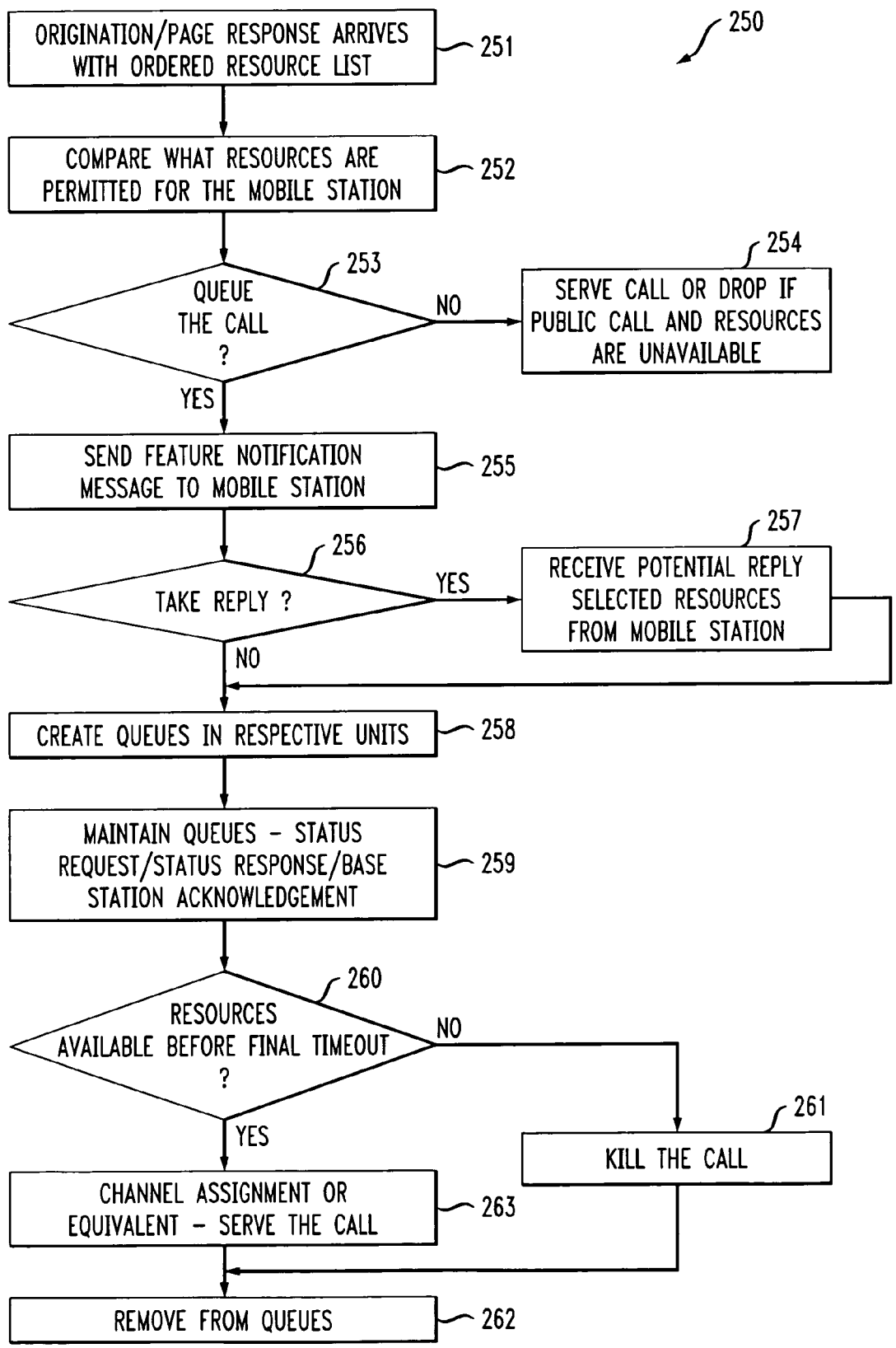
FIG. 7 is a flow chart of the overall method according to aspects of the present invention.

FIG. 7 is a flow chart of a method 250 for processing WPS and public calls. This flow chart represents the overall method and shows a more general view of what was discussed in FIG. 6 (while it assumes that the queuing for several resources in a sector is performed as also outlined above).

Initially, in step 251, an origination/page response arrives at the BS with an ordered resource list. The BS/Network then determine what resources are permitted for the mobile station 14 (252). Next, a determination is made as to whether the call will be queued (253). If queuing of this call is not to be performed (see the mechanism of those decisions/algorithm above), then the call could be served or it could be dropped in the specific case where it would be a public call and resources would not be available for it (254).

If queuing is to be done for this call, then the base station 12 sends a feature notification to the mobile station 14 (255) which contains the information which resources this call could be queued for, as well as information about the respective queue sizes and expected wait time in each queue. In an optional configuration, this being turned "on" the base station 12 via, for example, Extended System Parameters message, the BS 12 would communicate that it expects the reply (256). If so, it then receives the potential reply Selected Resources from the mobile station (257). In any case, either for the resources selected by the mobile/user and communicated via the Selected Resources message, or, without the Selected Resources message, for all possible resources shown in ORIGINATION/PAGE RESPONSE, queues are created in/for the respective hardware units/resources (258), like the hardware units supporting certain CDMA bandclass(es) or EV-DO. The queues are maintained via status request, status response and base station acknowledgment message exchange (259). However, this does not go on forever.

A determination is made as to whether there are resources available before a final timeout (260). If there is a final timeout, then the call would be killed (261) and then removed from the queue(s) (262). Otherwise, the call is served (263) when a resource becomes available. Finally, the call is removed from the queues (262).

The following examples illustrate some other aspects and some other variations of our approach.

EXAMPLE 3

Termination is, from our point of view here, analogous to origination. The mobile station 14 is paged, for example, via a General Page as shown in FIG. 6. An Extended Systems Parameter message conveys the system configuration which will contain the bandclasses and in general hardware available in the sector. A Page Response is sent from the mobile with the same parameters as in Origination. From this point on, the same messaging applies for this termination with regard to radio queuing as shown in FIG. 6 as well.

EXAMPLE 4

1xEV-DO Rev-0 technology can be included in the potential resource list. BS resources (including spectrum and the physical antenna) for such a pure data (non-voice) call are different than for CDMA voice, nevertheless, so will Rev. A, which will support voice and thus one could see the need for coordination between such diverse resource allocation for a call under disaster conditions which is the purpose of prioritizing NS/EP calls.

More options could be allowed in the future that could be programmed in the mobile station 14, perhaps via menus, that would result in an ordered list of resources acceptable for the call. This prioritized information would be contained somewhere in the Origination message. Specifically, both the call priority and potential resource list would be sent in a message to an entity that would coordinate call distribution between technologies.

EXAMPLE 5

Handoffs while waiting for resources to be allocated seem to be beyond the scope of the IR. Nevertheless, mobile stations servicing NS/EP calls should be able to move around, and, based on that, queue entries will need to be pre-emptied and created.

EXAMPLE 6

The mobile station 14 supports two bandclasses. Let us assume the call is NS/EP and one of the two queues would be full. In the variant of the method that favors more throughput and broader reach to the customers with the WPS preference while this variant still lets the highest priority callers get ahead of other priority calls in the queues that are not full—the call would only go to the queue which is not full.

EXAMPLE 7

The mobile station 14 supports two bandclasses. Let us say that it places a public call, and, furthermore, that both bandclasses already have a queue established on the respective sector where the mobile is found. If for either bandclass the radio traffic channel resources are available and allocated with preference to a public call request, then the call is honored selectively on that bandclass and counted correctly as such. Let us compare this to the old method. The presently known (old) method would count such honored call without respect to the resource type used. Consider the case where the first bandclass has some public calls being satisfied while the second bandclass may be essentially blocked for a long time by the users talking for a very long time. Now, the NS/EP call in the head of the queue can only use the second bandclass while N-1 public calls have just been satisfied on the first bandclass. In this situation, both public and NS/EP calls are completely blocked (which would be avoided in our approach).

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. A method of processing a call request received in a wireless network having an active call allocation system in place, the method comprising:
    determining whether radio traffic channel resources are available for the call request without involving a queue when at least one traffic channel can accommodate the call right away;
    where radio traffic channel resources are available without involving a queue, allowing the call request to go through;
    where radio traffic channel resources are not available without involving a queue, determining whether the call request is for a priority call; and
    where the call request is for a priority call:
        initially creating a queue for each radio traffic channel resource type potentially applicable to the call per cell sector available in the network and for each queue thus created;
        determining whether the queue is full;
        where the queue is not full, adding the priority call to the queue;
        where the queue is full, determining whether the queue has an existing call request of lower priority;
        where the full queue does not have an existing call request of lower priority, not entering the request in this queue and aborting the priority call request if the network is not able to enter the request to any queue; and
        where the full queue does have an existing call request of lower priority:
            displacing the existing call request of lower priority;
            aborting the displaced call if it is not in another queue; and
            adding the new call request to the queue with position determined by priority and time.

2. The method defined in claim 1, further comprising:
    where the call request is not for a priority call:
        determining whether call resources are available;
        where call resources are available, allowing the call to go through; and
        where call resources are not available, blocking the call.

3. The method defined in claim 1, wherein the wireless network comprises a CDMA-based network or a combination of several wireless network types.

4. A method of processing a call departure in a wireless network having an active call allocation system in place, the method comprising:
    determining whether to allocate a call request from a queue for a radio traffic channel resource type per cell sector or to a public call with a ratio 1/ N managed separately for each resource type, where for a Wireless Priority Service (WPS) ratio of 1/N, N-1 out of N times the radio traffic channel is allocated to arriving public call requests; and
    where the call request from the queue is to be allocated:
        determining whether the queue for a radio traffic channel resource type per cell sector is empty;
        where the queue is empty, acknowledging that radio traffic resources are available and releasing the queue; and
        where the queue is not empty, sewing the call request from the queue and releasing the call from any other queues in which the call request is located and counting the call assignment only in the queue where the resource was actually used.

5. The method defined in claim 4, further comprising:
    where the public call is to be allocated; and
    initiating the radio traffic channel's Available Channel Timer (ACT), wherein if the ACT expires before the radio traffic channel is assigned and there is a call in the WPS Queue, the radio traffic channel is used to serve a call request from the WPS queue—here, the radio traffic channel assignment is not counted toward the public or WPS allocation.

6. The method defined in claim 4, wherein the wireless network comprises a CDMA-based network or a combination of several wireless network types.

7. A method for processing an originating or terminating call from or to a mobile station in a wireless network having a priority call system, the method comprising:
    creating and keeping an ordered resource list in the mobile station;
    receiving in the network a message with the ordered resource list information in an origination or page response message;
    determining what radio traffic channel resources per cell sector are available for the mobile station;
    determining whether to queue the call; and
    where the call is to be queued:
        sending a feature notification message with an ordered resource list to the mobile station with detailed potential queue information including expected waiting times per resource type;
        receiving a Selected Resources message from the mobile station which may send this automatically or manually by the user; and
        creating a queue for each radio traffic channel resource type per cell sector that is available for the mobile station.

8. The method defined in claim 7, wherein the wireless network comprises a CDMA-based network or a combination of several wireless network types.

9. A call processing system for a wireless network having a priority call system, the system comprising:
- receiving means for receiving a message with an ordered resource list;
- first determining means for determining what radio traffic channel resources are available for the mobile station;
- second determining means for determining whether to queue the call;
- sending means for sending a feature notification message to the mobile station;
- sending means for sending a Selected Resources message with an ordered resource list;
- the mobile station accommodating programming, sending (in Origination, Page Response, Selected Resources messages), receiving (in Feature Notification message) and processing ordered resource lists; and
- creating means for creating a queue for each radio traffic channel resource type per cell sector that is available for the mobile station.

10. The system defined in claim 9, wherein the wireless network comprises a CDMA-based network or a combination of several wireless network types.

11. The system defined in claim 9, wherein handoffs between cell sectors modify content of the respective queues.

* * * * *